(12) United States Patent
Patterson et al.

(10) Patent No.: US 6,571,736 B2
(45) Date of Patent: Jun. 3, 2003

(54) FEEDER FOR MOIST FISH FEED

(76) Inventors: Lance H. Patterson, 160 Thorpe Road, L'Etang, New Brunswick (CA), E5C 2C2; Austin Robinson, 73 Utopia Road, Utopia, New Brunswick (CA), E5C 2E2

( * ) Notice: Subject to any disclaimer, the term of this patent is extended or adjusted under 35 U.S.C. 154(b) by 0 days.

(21) Appl. No.: 10/075,592

(22) Filed: Feb. 15, 2002

(65) Prior Publication Data

US 2002/0112671 A1 Aug. 22, 2002

(30) Foreign Application Priority Data

Feb. 22, 2001 (CA) ............................................ 2338588

(51) Int. Cl.⁷ ............................................ A01K 61/00
(52) U.S. Cl. ..................... 119/230; 119/51.04
(58) Field of Search .................. 119/230, 51.04, 119/57.91, 57.1; 209/241

(56) References Cited

U.S. PATENT DOCUMENTS

| 560,382 A | | 5/1896 | Walsh | |
| 577,179 A | | 2/1897 | Shadbolt | |
| 742,414 A | * | 10/1903 | Hale | 119/51.04 |
| 848,101 A | | 3/1907 | Hale | |
| 1,080,072 A | | 12/1913 | Mold | |
| 2,276,333 A | | 3/1942 | Ovestrud | |
| 3,022,767 A | * | 2/1962 | Malek | 119/51.04 |
| 3,192,915 A | * | 7/1965 | Norris et al. | 119/51.04 |
| 3,477,407 A | * | 11/1969 | Loudon | 119/51.04 |
| 3,523,520 A | * | 8/1970 | Evans | 119/230 |
| 3,526,210 A | * | 9/1970 | Burton | 119/51.04 |
| 3,701,422 A | | 10/1972 | Downey | |
| 3,964,512 A | | 6/1976 | Dumas | |
| 4,030,452 A | * | 6/1977 | Keen et al. | 119/57.1 |
| 4,158,469 A | | 6/1979 | Risser et al. | |
| 4,430,028 A | | 2/1984 | Clayton et al. | |

(List continued on next page.)

FOREIGN PATENT DOCUMENTS

| CA | 490535 | 2/1953 | |
| CA | 1159313 | 12/1983 | |
| CA | 1192935 | 9/1985 | |
| CA | 2145338 | 9/1996 | |
| DE | 3419108 A1 * | 11/1985 | A01K/61/02 |
| EP | 139783 A1 * | 5/1985 | B07B/13/00 |
| GB | 1165225 | 9/1969 | |
| GB | 2 257 884 A * | 1/1993 | |

*Primary Examiner*—Charles T. Jordan
*Assistant Examiner*—Joan M. Olszewski (57) ABSTRACT

In a feeder for dispensing moist feed pellets to fish in a fish farm, there are provided a feed storage hopper, a screen group for separating fish feed into edible-size pellets and feed waste, and a conveyor for conveying the feed material from the hopper to the screen group. The feed waste is collected in a receptacle for later recycling through a feed pellet extruder. The feeder also has an air delivery system comprising a venturi eductor and a nozzle for aspiring the edible-size pellets from the screen group and for delivering the pellets into an air stream directed toward a fish pen. Most importantly, the conveyor is a belt type conveyor with spaced-apart flights, providing this feeder with the ability to dispense discrete amounts of fish feed in an intermittent feed mode from the hopper, through the screen group and into the air delivery system.

20 Claims, 5 Drawing Sheets

U.S. PATENT DOCUMENTS

| | | | |
|---|---|---|---|
| 4,603,810 A | | 8/1986 | Schleimer et al. |
| 4,832,538 A | | 5/1989 | Bullerman et al. |
| 4,879,023 A | * | 11/1989 | Mallaghan ................. 209/241 |
| 4,904,128 A | | 2/1990 | Morimoto et al. |
| 4,983,280 A | * | 1/1991 | Eriksson ..................... 209/241 |
| 4,984,536 A | | 1/1991 | Powell et al. |
| 5,052,627 A | | 10/1991 | Balmer |
| 5,071,289 A | | 12/1991 | Spivak |
| 5,076,215 A | | 12/1991 | Yang |
| 5,098,557 A | | 3/1992 | Hirschler et al. |
| 5,112,474 A | | 5/1992 | Douglas |
| 5,150,666 A | * | 9/1992 | Momont et al. ......... 119/51.04 |
| 5,234,564 A | * | 8/1993 | Smith ......................... 209/241 |
| 5,294,065 A | | 3/1994 | Harms et al. |
| 5,337,698 A | | 8/1994 | Widmyer |
| 5,669,740 A | | 9/1997 | Townsend et al. |
| 5,732,652 A | * | 3/1998 | Allen ....................... 119/57.91 |
| 5,795,108 A | | 8/1998 | Lightle |
| 5,842,303 A | | 12/1998 | Abraham et al. |
| 5,937,787 A | | 8/1999 | Kopis |
| 5,979,666 A | * | 11/1999 | Douglas ..................... 209/241 |
| 6,012,875 A | | 1/2000 | Goettelmann et al. |
| 6,016,767 A | * | 1/2000 | Kyrkjebø ................. 119/51.04 |
| 6,082,299 A | * | 7/2000 | Halford ................... 119/51.04 |

* cited by examiner

FEEDER FOR MOIST FISH FEED

FIELD OF THE INVENTION

This invention pertains to apparatus for feeding fish in a fishpond or in a fish farming sea cage, and more particularly it pertains to an apparatus for screening and delivering moist fish feed pellets in an intermittent or pulsating mode.

BACKGROUND OF THE INVENTION

Many fish growers believe that moist feed pellets are better than dry pellets to nourish a school of fish. The moist pellets sink quickly below the water surface where they are available to the younger and less vigorous fish. This feature is believed to be particularly advantageous when starting the rearing of a stock of young fish.

The handling of moist feed pellets, however, represents some difficulties. The moist material tends to form lumps that cannot be processed through a mechanical feeder. The moist material tends to stick to machine parts and to build up in the machine passages to clog the machine.

Another difficulty with the handling of moist fish feed is found in the separation of the fine particles from the moist pellets. It has been observed that a batch of fish feed can contain over 10% of fine particles and fragments of broken pellets. These fine particles and fragments, referred to as feed waste, are generally not eaten by the fish and sink through the mesh at the bottom of the sea cage. These particles accumulate over the bottom of the body of water under the sea cage and rot with fish excrement. Such accumulation of decaying material under the sea cage can promote the development of disease agents and cause other discomforts to the fish being reared at that location. Therefore, a fallow period is normally provided between growth periods to allow for natural cleansing of the cage site.

It will be appreciated that there are incentives for fish growers to reduce the pollution generated under a sea cage from the accumulation of waste feed, and by the same action to reduce the extent of the fallow periods. There are also economic incentives to separate and collect the feed waste at the feeder for later recycling into whole feed pellets. These incentives impose a heavy demand on the existing feeders. This demand is believed to be greater than the capacity available in the prior art.

Some of the prior art feeders produce a constant flow of feed material. Examples of these apparatus are described and illustrated in the following documents:

U.S. Pat. No. 4,832,538 issued on May 23, 1989 to Steve Bullerman et al.;
U.S. Pat. No. 4,984,536 issued on Jan. 15, 1991 to James W. Powell et al.;
U.S. Pat. No. 5,076,215 issued on Dec. 31, 1991 to Ning C. Yang, and
U.S. Pat. No. 5,337,698 issued on Aug. 16, 1994 to Ronald L. Widmyer.

Each of these apparatus uses a feed screw or a rotary valve to deliver a constant amount of feed material to the inlet of a venturi eductor, where the feed material is blown away in an air stream.

In another apparatus of the prior art, there is provided a system to recover feed waste falling at the bottom of a sea cage. The feed waste is then available for recycling. This system is described in the following document.

CA 2,145,338, a patent application published on Sep. 24, 1996.

In another type of apparatus, an endless belt conveyor with spaced-apart flights is used to feed the material out of a hopper and into a fish pen. A limited amount of material is carried out by each flight, and for this reason, these apparatus are capable of producing an intermittent flow of fish feed. Examples of equipment belonging of this group are described in the following documents:

U.S. Pat. No. 848,101 issued on Mar. 26, 1907 to H. S. Hale, and
U.S. Pat. No. 5,842,303 issued on Dec. 1, 1998 to George Abraham et al.

Because of their intermittent feed characteristics, the apparatus in this last group are believed to be efficient in delivery moist feed material without clogging. However, the designs of these apparatus do not offer any suggestion to recover the feed waste, or to deliver the feed pellets in an air stream. The apparatus from the first group using blowers do not offer any suggestion to prevent clogging when processing moist feed material, or to separate the feed waste from the whole feed pellets. Generally, the apparatus of the prior art have been used with limited success with moist fish feed, and therefore numerous fish growers still have recourse to hand feeding, despite the high labour cost of this practice.

As such, it may be appreciated that there continues to be a need for a new and improved apparatus to deliver moist fish feed in a reliable manner without clogging and with the ability to screen and recover the feed waste for recycling.

SUMMARY OF THE INVENTION

The present invention provides a feeder having screening abilities, an intermittent feed mode and an articulated air delivery system for dispensing moist feed pellets over a wide area of a fishpond or a sea cage with minimum or no clogging thereof.

In accordance with one feature of the present invention, there is provided a feeder for dispensing moist feed pellets to fish in a fish farming installation. The feeder comprises a feed storage hopper, a screen group to separate the feed material into edible-size pellets and feed waste, and a conveyor for conveying the feed material from the hopper to the screen group. The feed waste is collected in a receptacle for later recycling through a feed pellet extruder. The feeder also has an air delivery system for aspiring the edible-size pellets from the screen group and for delivering the pellets into an air stream directed toward a fish pen. Most importantly, the conveyor is a belt type conveyor with spaced-apart flights, providing this feeder with the ability to dispense discrete amounts of fish feed in an intermittent feed mode from the hopper, through the screen group and into the air delivery system.

One advantage of the intermittent feed mode is that it greatly reduces the sticking of moist feed material to the machine parts. It is therefore possible to screen the feed material to an extent which is unheard of with feeders of the prior art. During tests in an actual installation, a total of 10.9% of the feed material has been recovered as feed waste. This material was re-extruded and reuse. As one can imagine the recovery of this feed waste represents a substantial saving in feed cost to the fish grower.

In accordance with another feature of the present invention, the screen group comprises a primary and secondary screens, each having a different bar spacing, and a reciprocating mechanism affixed to the screens for vibrating the screens with different stroke lengths corresponding substantially to their bar spacings. This feature contributes to an efficient screening of the feed material without applying unnecessary stress on the feed pellets.

In yet another feature of the present invention, the air delivery system comprises a venturi eductor, a nozzle and an articulated support assembly for supporting and moving the venturi eductor and the nozzle from side to side and up and down. The air delivery system also comprises an accept belt conveyor having a discharge end. The venturi eductor comprises an inlet pipe having a mouth opening over the discharge end of the accept conveyor for aspiring feed pellets from the discharge end. The mouth opening has a D-like shape comprising a straight edge being contiguous with or near the surface of the conveyor. The articulated support assembly has a horizontal axis of articulation aligned with the straight edge and a vertical axis of articulation passing through a mid-point on the straight edge. This air delivery system is particularly appreciable for delivering feed pellets in many directions without losing the suction at the mouth opening of the inlet pipe.

In yet another aspect of the present invention, the articulated support assembly is movably mounted on the frame of the feeder and is adjustable in up and down directions to reduce or increase a gap between the straight edge of the mouth opening and the conveyor belt.

Other advantages and novel features of the present invention will become apparent from the following detailed description of the preferred embodiment.

BRIEF DESCRIPTION OF THE DRAWINGS

One embodiment of the present invention is illustrated in the accompanying drawings, in which like numerals denote like parts throughout the several views, and in which.

DESCRIPTION OF THE PREFERRED EMBODIMENT

While this invention is susceptible of embodiment in many different forms, there is shown in the drawings and will be described in details herein one specific embodiment, with the understanding that the present disclosure is to be considered as an example of the principles of the invention and is not intended to limit the invention to the embodiment illustrated and described. Although the feeder according to the present invention has been used successfully with moist pellets, it has also been used with excellent results with dry pellets. Therefore it is not the intent of the following description to limit the application of this feeder to moist feed material only.

Figure 1:
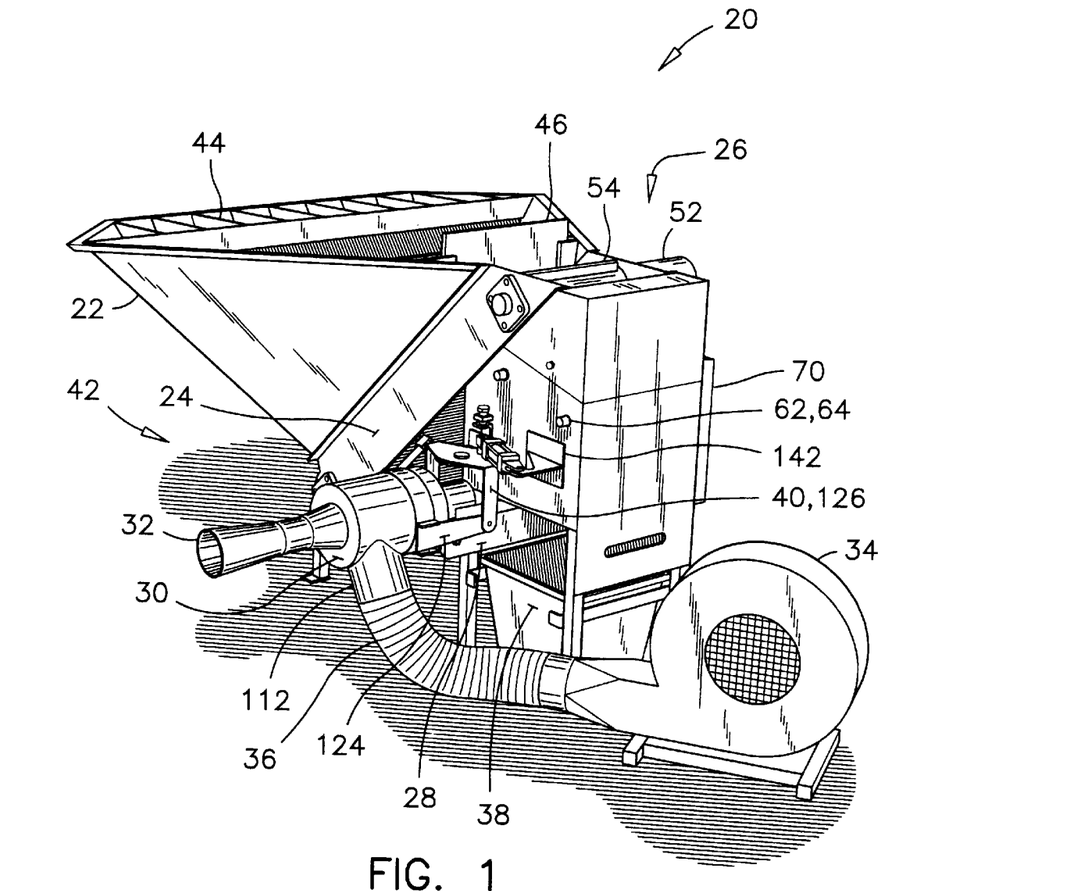
FIG. 1 is a perspective view of an installation of the feeder for moist fish feed according to the preferred embodiment of the present invention.

Referring to the FIG. 1, the feeder for moist fish feed according to the preferred embodiment 20 comprises broadly, a hopper 22 in which moist feed material is loaded. An endless main belt conveyor 24 is mounted along an incline adjacent the hopper 22, and constitutes one side of the hopper 22. Under the discharge end of the main conveyor, there is provided a screen group 26 wherein the fish feed material is separated into whole feed pellets and recoverable feed waste. The whole feed pellets are fed into an accept conveyor 28 where they are picked up by a venturi eductor 30 and blown away through a nozzle 32 into an air stream created by a blower 34 connected by the hose 36 to the venturi eductor 30. The feed waste is collected in a waste receptacle 38 under the screen group 26. The feed waste is therefore available for re-extruding into whole pellets through a pelletizing machine.

In the preferred feeder 20, the venturi eductor 30 and nozzle 32 are movable form side to side and up and down by means of an articulated support assembly 40. The venturi eductor 30, the nozzle 32, the blower 34 and hose 36, and the articulated support assembly 40 constitute the air delivery system 42 of the preferred feeder 20.

The hopper 22 has a grate 44 over a portion thereof to assist an operator in breaking the odd chunks of feed material into screenable lumps. There is also provided an adjustable gate 46 above the main conveyor 24 to regulate the amount of feed material being carried by the main conveyor 24.

Referring now to FIGS. 1–4, the processing of feed material will be explained in details. The main conveyor 24 has an endless belt 50 driven by a motor 52. The motor 52 is connected to the upper shaft of the main conveyor 24 and is partly illustrated in FIG. 1. The endless belt 50 has a series of spaced-apart flights 54 to carry discrete amounts of feed material such that this feed material can be fed through the screen group 26 in an intermittent feed mode.

Figure 2:
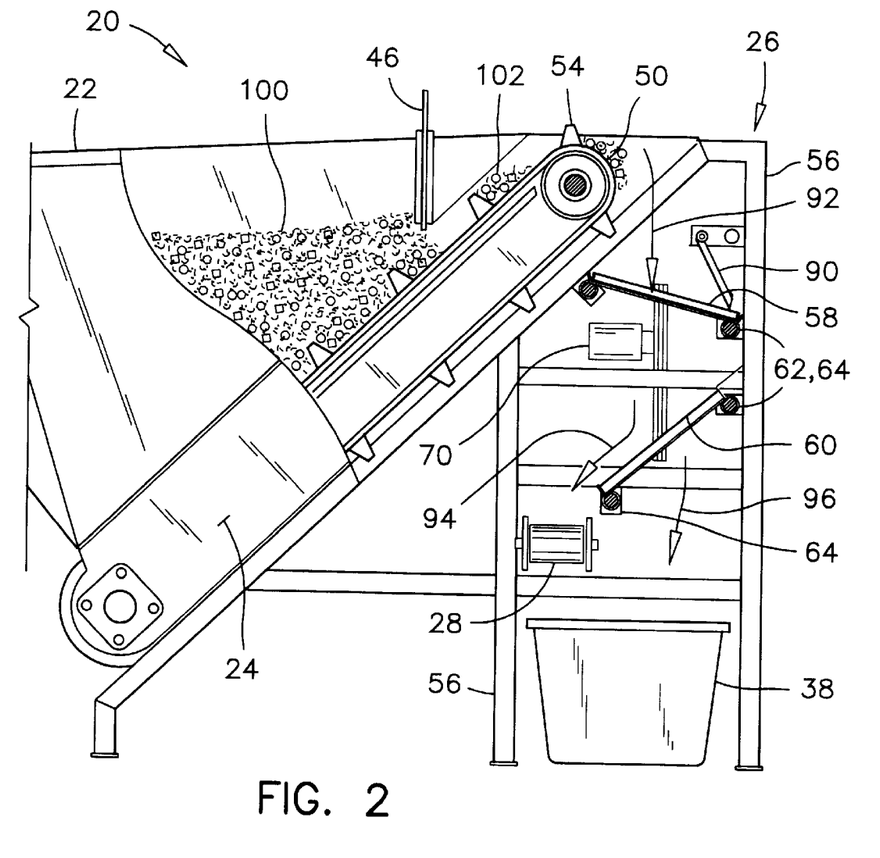
FIG. 2 is a partial longitudinal cross-section view of the preferred feeder.
Figure 3:
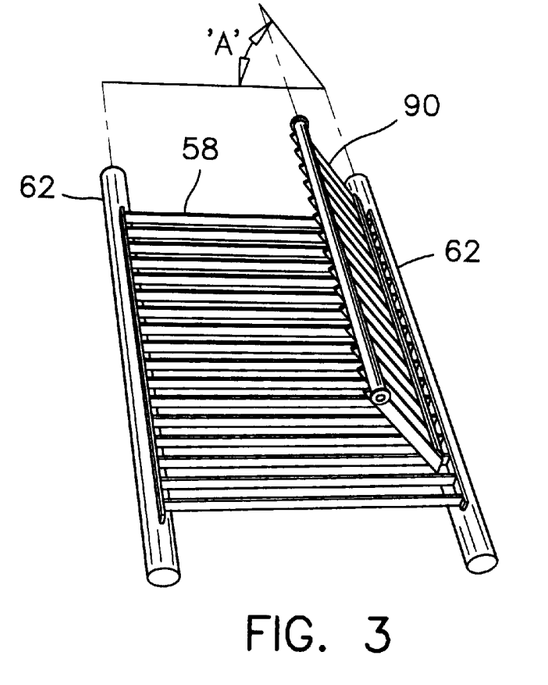
FIG. 3 is a perspective view of the primary screen and the lump breaker mounted in the screen group of the preferred feeder.

The screen group 26 comprises a frame 56, a primary screen 58 and a secondary screen 60. Both screens are movably mounted into the frame 56. The primary screen 58 has screen openings to prevent the passage of large pellets and lumps, while letting the edible-size pellets and feed waste there through. A preferred bar spacing in the primary screen 58 is between about ½ inch and about ⅝ inch. The secondary screen 60 has openings to prevent the passage of the edible-size pellets and to let feed waste there through. A preferred bar spacing in the secondary screen 60 is between about ¼ inch and about ⅜ inch.

Each of the primary and secondary screens 58,60 is mounted on two rails 62 as illustrated in FIG. 3. These rails 62 are movably supported through linear bearings 64 mounted in the frame 56 of the feeder, as partly illustrated in FIGS. 1 and 2. These linear bearings 64 and their mountings are not illustrated in details herein because they do not constitute the essence of the present invention and are well known to machine designers.

Figure 4:
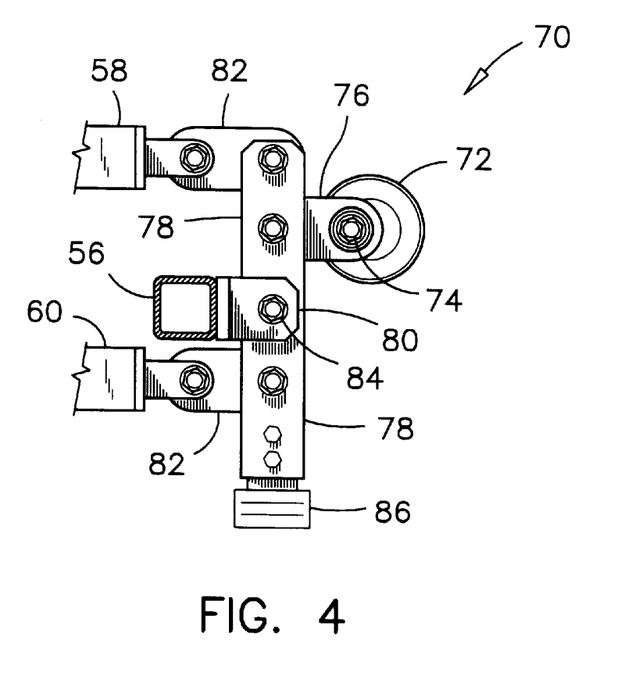
FIG. 4 is a partial side view of the reciprocating mechanism used for imparting reciprocating movements in the primary and secondary screens.

Both the primary screen 58 and the secondary screen 60 are movable back and forth and in opposite directions through their respective linear bearings 64, by means of a reciprocating mechanism 70. In the preferred feeder, this mechanism 70 is mounted at the far end of the screens when seen in the side view of FIG. 2. This mechanism consists of a motor 72, an eccentric shaft 74 driven by the motor 72 and affixed to a drive link 76. The eccentric shaft 74 has an offset dimension of about ⅛ inch. The drive link 76 is pivoted to a tilt bar 78 which in turn is pivoted about its centre to a bracket 80 mounted to the frame 56. Upon the ends of the tilt bar 78, there is provided a pair of driven links 82 pivoted thereto and to one of the primary and secondary screens 58, 60. A rotation of the drive motor 72 causes the tilt bar 78 to oscillate back and forth about the pivot 84 in the bracket 80, and causes both screens 58, 60 to move back and forth along their rails 62.

The positions of the mountings of the driven links 82 along the tilt bar 78 are preferably selected to provide a displacement in the primary screen 58 which is about twice as long as the stroke length of the secondary screen 60. This feature is advantageous for causing movements in the screens which correspond more or less to their respective bar spacings. The different stroke lengths of the screens are believed to contribute to an efficient screening of the feed materials while not subjecting the feed pellets to unnecessary stresses.

A counterweight 86 may be provided at the lower end of the tilt bar 78 to overcome the effect of the inertia of the reciprocation mechanism 70 on the drive motor 72.

Referring back to FIGS. 2 and 3, the primary screen 58 is inclined downward away from the main conveyor 24. A lump breaker grate 90 is affixed to the frame 56 over the lower end of the primary screen 58 and forms with the lower end of the primary screen 58 an acute angle 'A' of about 50 degrees. The lump breaker grate 90 remains fixed relative to the frame 56 and to the primary screen 58.

In use, the feed material containing lumps falls down over the primary screen 58 as indicated by arrow 92 in FIG. 2. The whole pellets pass through the screen 58 and the lumps are deflected against the lump breaker grate 90 where they are ground against the lump breaker grate 90 by the reciprocating action of the primary screen 58. The lumps are ground until broken down in smaller pieces capable of passing through the primary screen 58.

The secondary screen 60 is set below the primary screen 58 and is sloping downward in the opposite direction relative to the primary screen 58. These opposite inclinations of the screens cause a sudden change of direction in the movement of the feed pellets, and enhance the separation of the feed waste from the feed pellets.

As can be seen, the inclination of the secondary screen 60 causes the edible-size pellets to fall into the accept conveyor 28. The secondary screen 60 acts as a deflector to convey the feed pellets into the accept conveyor 28 as indicated by arrow 94. The feed waste passing through the secondary screen 60 is collected in a waste receptacle 38 below the secondary screen 60 as indicated by arrow 96.

In use, the feed material 100 is taken up by the flights 54 of the main conveyor 24 in small discrete amounts 102. The spacing between the flights and the speed of the main conveyor are selected to let each discrete amount 102 pass through the screen group before a next amount is fed down. Similarly, the spacing between the flights 54 and the speed of the conveyor belt 50 are selected to ensure that each discrete amount is fed through the air delivery system 42 in an intermittent feed manner. This feature has been found to be advantageous for preventing clogging of the feeder.

It is believed that the intervals between the discrete amounts 102 contribute to letting the feed waste flow through the screens 58, 60 without clogging the screens. It is believed that this features, basically, provides the screens with a self-cleaning effect. Similarly, it is believed that the intermittent feed of pellets through the air delivery system 42 provides this air delivery system with the ability to clean itself after each blown measure 102. It is believed that this intermittent feed feature contributes greatly to the free-flowing or low-clogging properties of the feeder according to the preferred embodiment.

In that regard, an efficient operation of the feeder has been obtained with a flight spacing of about 8 inches, a flight width of about 12 inches and flight height of about 1 inch. The speed of the belt was selected to provide a feed material delivery rate of up to 110 lbs. per minute. In this installation, the capacity of the blower 34 was selected to provide a pellet throwing distance of about 60 to 70 feet.

Figure 5:
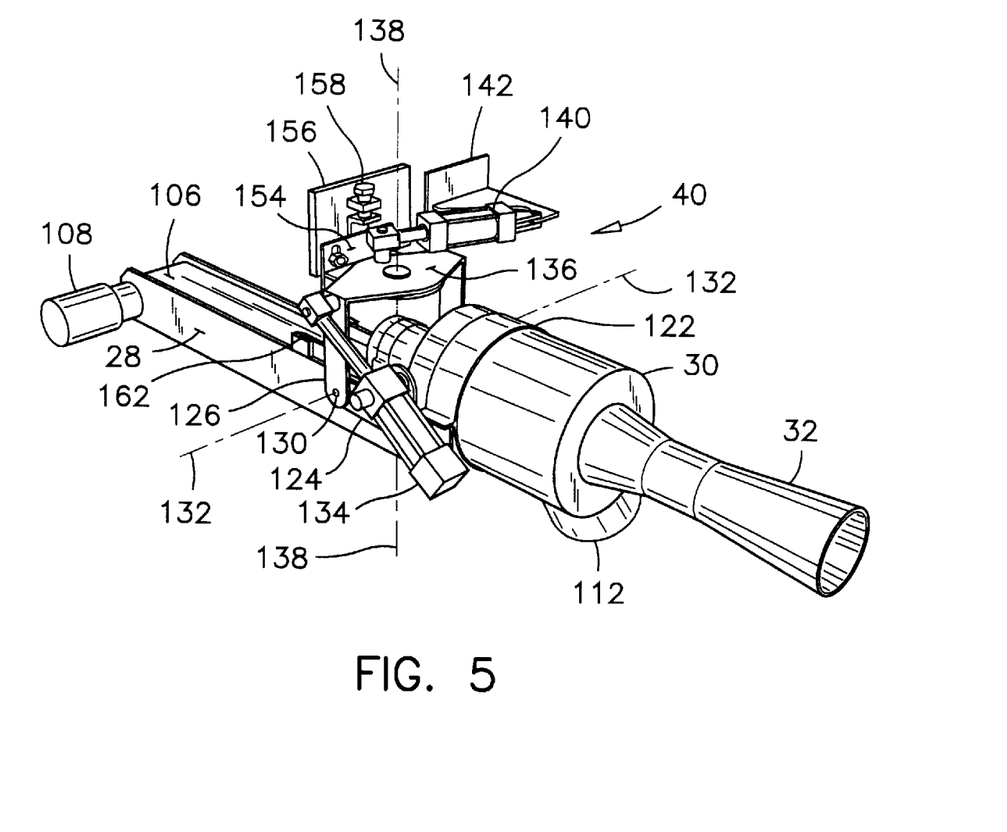
FIG. 5 is a perspective view of the accept conveyor and the air delivery system.
Figures 6, 7:
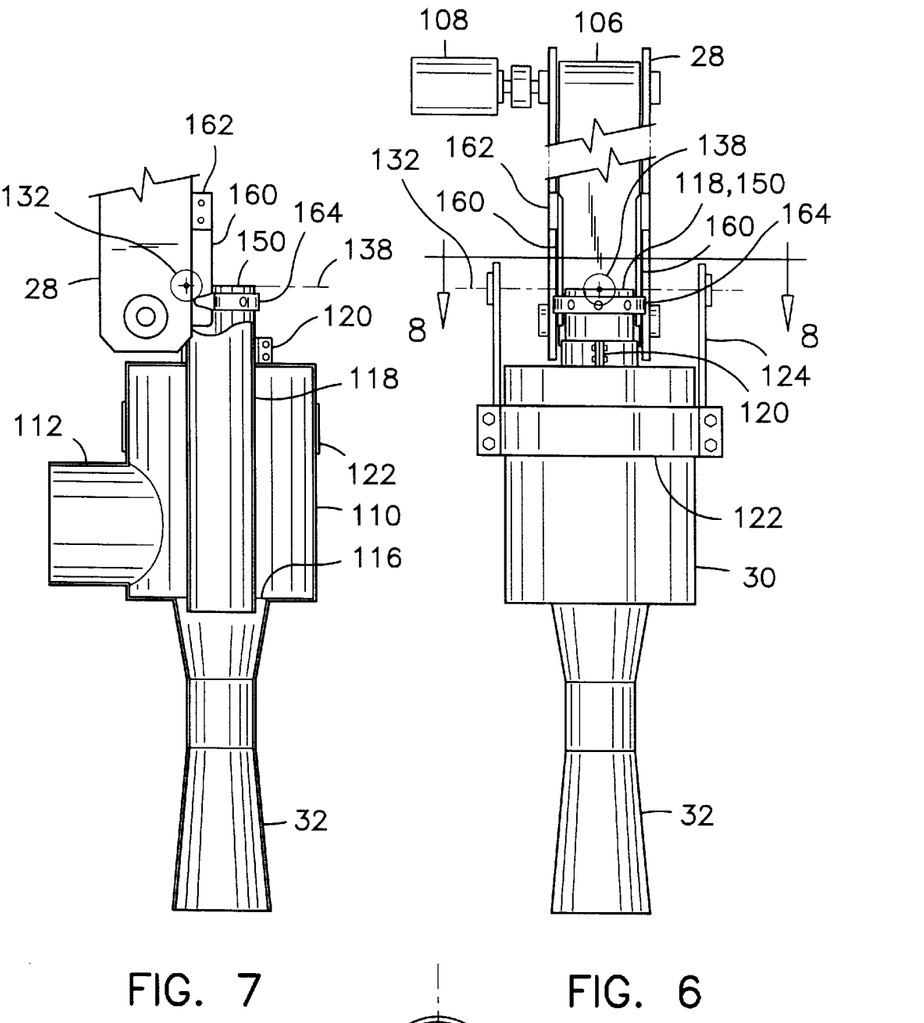
FIG. 6 is a partial top view of the accept conveyor and the air delivery system.
FIG. 7 is a partial longitudinal cross-section view of the accept conveyor and the air delivery system.

Referring now to FIGS. 5 to 8, the air delivery system 42 will be explained in greater details. The accept conveyor 28 has an endless belt 106 driven by a motor 108. Referring particularly to FIG. 7, the venturi eductor 30 has a cylindrical casing 110, an air supply pipe 112 entering the cylindrical casing 110 at right angle with the central axis of the casing and which is connected to the air blower 34 by the hose 36, as previously explained. The cylindrical casing 110 has a throat opening 116 in one end thereof from which extends a nozzle or a discharge pipe 32. The venturi eductor 30 has a suction, or inlet pipe 118 extending along a central axis thereof opposite the nozzle 32 and into the throat opening 116.

The position of the inlet pipe 118 along the central axis of the cylindrical casing 110 is adjustable relative to the throat opening 116 to create more or less suction in the inlet pipe 118 and to increase or decrease the pellet delivery distance. The position of the inlet pipe 118 relative to the cylindrical casing 110 is adjustable by sliding it along its length and clamping it in the first clamp collar 120 affixed to the end of the cylindrical casing 110. The position of the cylindrical casing 110 is also adjustable relative to the position of the accept conveyor 28 by means of a second clamp collar 122 enclosing the circumference of the cylindrical casing 110. The second clamp collar 122 is affixed to a pair of support arms 124 extending rearward from the collar 122 relative to the nozzle 32. The support arms 124 are pivoted to two support braces 126 on the articulated support assembly 40. The attachment of the arms 124 to the support braces 126 consists of a pair of pivots 130 jointly defining a horizontal axis 132. The venturi eductor 30 and the nozzle 32 are movable about this horizontal axis 132 by means of a first linear actuator 134 affixed to one of the arms 124 and to one of the support braces 126.

The support braces 126 extend downward from a turn table 136 which is movable about a vertical axis 138 by means of a second linear actuator 140 affixed to the turn table 136 and to a bracket 142 mounted to the frame 56 of the feeder. Due to this arrangement, the venturi eductor 30 and the nozzle 32 are movable from side to side and up and down to dispense feed pellets over a wide area of a fish pen.

Figure 8:
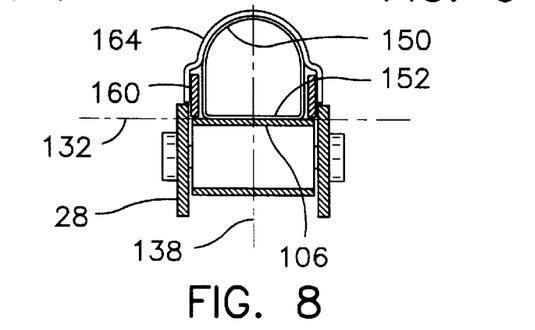
FIG. 8 is a cross-section view of the accept conveyor and the inlet pipe, as seen along line 8—8 in FIG. 6.

It will be appreciated that during a movement of the venturi eductor 30, the inlet pipe 118 moves as well. For this reason, the inlet pipe 118 has a D-shaped mouth opening 150 in which the straight edge 152 lies near or lightly touches the surface of the belt 106 of the accept conveyor 28, over the downstream end of the accept conveyor. The straight edge 152 is contiguous with the horizontal axis 132 and has a mid-point intersected by the vertical axis 138. This arrangement causes the straight edge 152 of the inlet pipe 118 to remain near the belt 106 and centred with the belt when the nozzle 32 is moved from side to side and up and down.

The turn table 136 is mounted to a bracket 154 which is adjustably mounted to a support plate 156 affixed to the frame 56 of the feeder 20. The bracket 154 is adjustable in up or down positions relative to the support plate 156 by means of a set screw 158 and clamping bolts or otherwise. It will be appreciated that the provision of the set screw 158 is advantageous for adjusting a gap between the straight edge 152 on the inlet pipe 118 and the surface of the belt 106.

In order to further increase the efficiency of the feeder, there is provided a pair of flexible blades 160 enclosing the mouth opening 150 of the inlet pipe 118. The blades 160 are mounted to the tabs 162 on the sides of the accept conveyor 28, and each blade has a free end extending alongside the mouth opening 150 of the inlet pipe 118. There is provided a semi-circular band 164 over the top portion of the inlet pipe 118, near the mouth opening 150. This band 164 extends down along both sides of the mouth opening 150 and encloses loosely the flexible blades 160 to loosely retain the flexible blades 160 against the mouth opening 150. During movement of the inlet pipe 118 relative to the accept conveyor 28, the flexible blades 160 deflect the feed pellets into the mouth opening 150 of the inlet pipe 118 in order to maintain the efficiency of the feeder 20 regardless of the orientation of the nozzle 32.

As to other manner of usage and operation details of the present invention, the same should be apparent from the above description and accompanying drawings, and accordingly, further discussion relative to the manner of usage and operation details would be considered repetitious and is not provided.

While one embodiment of the present invention has been described hereinabove, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

We claim:

1. An apparatus for delivering moist fish feed pellets to fish in a fish farming installation, comprising:
    a storage hopper for storing moist fish feed pellets;
    a screen group for screening said moist fish feed pellets into feed waste and edible-size feed pellets, comprising a primary screen superimposed over a secondary screen, a reciprocating mechanism having means for vibrating said primary and secondary screens, and a lump breaker grate mounted adjacent said primary screen;
    means for delivering discrete amounts of said moist fish feed pellets in an intermittent feed mode from said storage hopper and into said screen group;
    an air delivery system for delivering said edible-size feed pellets from said screen group and into an air stream directed toward a fish farming installation, and
    means for dispensing discrete amounts of said edible-size feed pellets in an intermittent feed mode into said air delivery system.

2. The apparatus as claimed in claim 1 further having a receptacle laid under said screen group for collecting said feed waste.

3. The apparatus as claimed in claim 1 wherein said means for delivering comprises a belt conveyor with spaced-apart flights.

4. The apparatus as claimed in claim 1, wherein said air delivery system comprises a venturi eductor and a nozzle, and means for moving said nozzle from side to side and up and down.

5. The apparatus as claimed in claim 1, wherein said primary and secondary screens have respective bar spacings, and said means for vibrating said primary and secondary screens comprises means for vibrating said primary and secondary screens according to stroke lengths corresponding to said respective bar spacings.

6. The apparatus as claimed in claim 1, wherein said primary screen is inclined downward away from said means for delivering and said secondary screen is inclined downward opposite an inclination of said primary screen.

7. The apparatus as claimed in claim 1, wherein said primary screen is inclined downward away from said means for delivering, and forms an acute angle with said lump breaker grate with an apex of said angle on a lower edge of said primary screen.

8. The apparatus as claimed in claim 4 wherein said air delivery system also comprises a belt-type accept conveyor having a discharge end, and said venturi eductor comprises an inlet pipe having a mouth opening extending over said discharge end for aspirating feed pellets from said discharge end.

9. The apparatus as claimed in claim 8, wherein said mouth opening has a D-like shape comprising a straight edge extending along a surface of said accept conveyor.

10. The apparatus as claimed in claim 9, wherein said means for moving said nozzle from side to side and up and down has a horizontal axis of articulation contiguous with said straight edge and a vertical axis of articulation passing through a mid-point on said straight edge.

11. The apparatus as claimed in claim 10, wherein said means for moving said nozzle further comprises means for moving said straight edge toward and away from said surface of said accept conveyor.

12. An apparatus for delivering moist feed pellets to fish in a fish farming installation, comprising:
    a fish feed storage hopper;
    a screen group having means for screening fish feed into feed waste and edible-size feed pellets;
    means for delivering fish feed from said storage hopper and into said screen group;
    an air delivery system for delivering said edible-size pellets from said screen group and into an air stream directed toward a fish farming installation, said air delivery system comprising an accept conveyor having a downstream end, and means for aspirating fish feed pellets from said downstream end into said air stream comprising an inlet pipe, a D-shaped mouth opening on said inlet pipe, said D-shaped mouth opening having a straight edge contiguous with a surface of said accept conveyor, and means for moving said air stream from side to side and up and down.

13. The apparatus as claimed in claim 12, further comprising means for collecting said feed waste under said screen group.

14. The apparatus as claimed in claim 12, wherein said means for moving said air stream from side to side and up and down comprises a horizontal axis of articulation contiguous with said straight edge and a vertical axis of articulation passing through a mid-point on said straight edge.

15. An apparatus for delivering moist feed pellets to fish in a fish farming installation, comprising:
    a fish feed storage hopper;
    a main conveyor comprising an endless belt with spaced-apart flights and a discharged end, said main conveyor being mounted in an inclined position inside and under said fish feed storage hopper, for carrying fish feed out of said fish feed storage hopper;

an adjustable gate mounted in said fish feed storage hopper, above an intermediate region of said main conveyor for regulating an amount of fish feed carried by said main conveyor;

a primary screen mounted under said discharge end of said main conveyor; said primary screen having a lump breaker incorporated therein for breaking lumps in said fish feed;

a secondary screen mounted under said primary screen and having means for separating said fish feed into feed pellets and feed waste and an accept product deflector, and an accept conveyor having a downstream end and being mounted under said accept product deflector for carrying said feed pellets from said accept product deflector to said downstream end;

an air delivery system mounted at said downstream end of said accept conveyor, and comprising a mechanism for movement thereof from side to side and up and down;

said air delivery system having means for aspirating fish feed pellets from said downstream end of said accept conveyor and for blowing said fish feed pellets away from said downstream end, and a receptacle mounted under said secondary screen for collecting said feed waste passing through said secondary screen;

such that said apparatus is usable for breaking, screening and delivering moist fish feed pellets in an intermittent feed mode to fish in said fish farming installation and said feed waste is available for recycling into fish feed pellets.

16. The apparatus as claims in claim 15, further having a reciprocating mechanism affixed to said primary screen and said secondary screen for vibrating said primary screen and said secondary screen.

17. The apparatus as claimed in claim 15, wherein said means for aspirating fish feed pellets from said downstream end of said small conveyor comprises an inlet pipe, a D-shaped mouth opening on said inlet pipe, and a straight edge on said D-shaped mouth opening, and said straight edge being laid against a surface of said small conveyor, and said mechanism for movement comprises a horizontal axis aligned with said straight edge and a vertical axis passing through a mid-point on said straight edge.

18. An apparatus for delivering fish feed pellets to fish in a fish pen, comprising:

a storage hopper for storing fish feed pellets;

a screen group for screening said fish feed pellets into feed waste and edible-size feed pellets, comprising a primary screen superimposed over a secondary screen, a reciprocating mechanism having means for vibrating said primary and secondary screens, and a lump breaker grate mounted adjacent said primary screen;

means for delivering said fish feed pellets in an intermittent feed mode from said storage hopper and into said screen group; and means for delivering said edible-size feed pellets from said screen group and into said fish pen.

19. The apparatus as claimed in claim 18, wherein said means for delivering said edible-size feed pellets comprises an air delivery system having a venturi eductor and a nozzle.

20. The apparatus as claimed in claim 18, further having a receptacle laid under said screen group for collecting said feed waste.

\* \* \* \* \*

UNITED STATES PATENT AND TRADEMARK OFFICE
CERTIFICATE OF CORRECTION

PATENT NO. : 6,571,736 B2
DATED : June 3, 2003
INVENTOR(S) : Lance H. Patterson and Austin Robinson It is certified that error appears in the above-identified patent and that said Letters Patent is hereby corrected as shown below:

<u>Title page,</u>
Item [74], the name of the *Attorney, Agent, or Firm* should be:
-- Mario D. Theriault --

Signed and Sealed this

Twenty-first Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,571,736 B2
DATED : June 3, 2003
INVENTOR(S) : Lance H. Patterson et al.

It is certified that error appears in the above-identified patent and that said Letters Patent is hereby corrected as shown below:

This certificate supersedes Certificate of Correction issued October 21, 2003, the number was erroneously mentioned and should be vacated since no Certificate of Correction was granted.

Signed and Sealed this

Eleventh Day of November, 2003

JAMES E. ROGAN
*Director of the United States Patent and Trademark Office*